US012348612B2

(12) United States Patent
Gaddam et al.

(10) Patent No.: US 12,348,612 B2
(45) Date of Patent: *Jul. 1, 2025

(54) SYSTEM, METHOD, AND COMPUTER PROGRAM PRODUCT FOR DATA SECURITY

(71) Applicant: Visa International Service Association, San Francisco, CA (US)

(72) Inventors: Sivanarayana Gaddam, Santa Clara, CA (US); Yogesh Lokhande, Kada Agrahara (IN); Biju Abraham, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,491

(22) Filed: Sep. 1, 2023

(65) Prior Publication Data

US 2023/0421359 A1 Dec. 28, 2023

Related U.S. Application Data

(63) Continuation of application No. 17/217,257, filed on Mar. 30, 2021, now Pat. No. 11,784,798.

(51) Int. Cl.
*H04L 29/06* (2006.01)
*H04L 9/06* (2006.01)
(Continued)

(52) U.S. Cl.
CPC .......... *H04L 9/0822* (2013.01); *H04L 9/0643* (2013.01); *H04L 9/30* (2013.01)

(58) Field of Classification Search
CPC ..... H04L 9/0816; H04L 9/0822; H04L 9/085; H04L 9/0861; H04L 9/0643; H04L 9/30
See application file for complete search history.

(56) References Cited

U.S. PATENT DOCUMENTS

| 8,788,803 B2 | 7/2014 | Irvine |
| 9,483,657 B2 | 11/2016 | Paul et al. |

(Continued)

FOREIGN PATENT DOCUMENTS

| CN | 105871858 A | 8/2016 |
| CN | 107533616 A | 1/2018 |

(Continued)

OTHER PUBLICATIONS

Song et al., "Efficient Attribute-Based Encryption with Privacy-Preserving Key Generation and Its Application in Industrial Cloud", Security and Communication Networks, 2019, pp. 1-10.

*Primary Examiner* — Malcolm Cribbs
(74) *Attorney, Agent, or Firm* — The Webb Law Firm

(57) ABSTRACT

Systems, methods, and computer program products for data security store, in memory, a plurality of ciphers in association with a plurality of public keys, the plurality of ciphers including a plurality of secret keys encrypted with a key encryption key, and the plurality of secret keys corresponding to the plurality of public keys; receive, a data chunk for encryption; generate, a data encryption key based on a hash function, a public key of the plurality of public keys, and a random number; encrypt, the data chunk with the data encryption key to generate an encrypted data chunk; generate, a header including a cipher of the plurality of ciphers corresponding to the public key of the plurality of public keys and key encapsulation data; and store, in a database, a cipher text including the header and the encrypted data chunk.

15 Claims, 10 Drawing Sheets

(51) Int. Cl.
*H04L 9/08* (2006.01)
*H04L 9/30* (2006.01)

(56) References Cited

U.S. PATENT DOCUMENTS

| | | |
|---|---|---|
| 10,615,969 B1 | 4/2020 | Griffin et al. |
| 11,080,412 B1 | 8/2021 | Moore |
| 11,146,390 B2 | 10/2021 | Chu et al. |
| 2004/0174997 A1 | 9/2004 | Yamamichi et al. |
| 2013/0111196 A1 | 5/2013 | Pasam et al. |
| 2013/0290703 A1 | 10/2013 | Resch et al. |
| 2015/0278531 A1 | 10/2015 | Smith et al. |
| 2017/0149564 A1 | 5/2017 | McCallum |
| 2017/0373841 A1 | 12/2017 | Nagai et al. |
| 2018/0176013 A1* | 6/2018 | Cheng .................... G06F 21/64 |
| 2019/0114438 A1 | 4/2019 | Hersans et al. |
| 2020/0106608 A1* | 4/2020 | Lo .......................... G06F 21/57 |
| 2021/0124731 A1 | 4/2021 | Sewell et al. |
| 2022/0092207 A1 | 3/2022 | Ozaki et al. |
| 2022/0116776 A1 | 4/2022 | Spangler et al. |

FOREIGN PATENT DOCUMENTS

| | | |
|---|---|---|
| CN | 110417726 A | 11/2019 |
| WO | 2015160385 A1 | 10/2015 |

* cited by examiner

SYSTEM, METHOD, AND COMPUTER PROGRAM PRODUCT FOR DATA SECURITY

CROSS-REFERENCE TO RELATED APPLICATION

This application is a continuation of U.S. patent application Ser. No. 17/217,257, filed Mar. 30, 2021, the disclosure of which is hereby incorporated by reference in its entirety.

BACKGROUND

1. Field

This disclosure relates to data security and, in some non-limiting embodiments or aspects, to a scalable data security service with one-time token decryption.

2. Technical Considerations

A hardware security module (HSM) is a physical computing device that safeguards and manages digital keys, performs encryption and decryption functions for digital signatures, strong authentication and other cryptographic functions. A hardware security module contains one or more secure cryptoprocessor chips for carrying out cryptographic operations, embedded in a packaging with multiple physical security measures, which give it a degree of tamper resistance.

Data security services may use HSMs to protect transactions and files. However, the use of HSMs by data security services to protect transactions and files may be relatively expensive and difficult to scale and maintain.

SUMMARY

Accordingly, provided are improved systems, devices, products, apparatus, and/or methods for data security.

According to some non-limiting embodiments or aspects, provided are a method, a system, and a computer program product that store, in memory, a plurality of ciphers ($C_1, C_2, \ldots C_n$) in association with a plurality of public keys ($PK_1, PK_2, \ldots PK_n$), wherein the plurality of ciphers ($C_1, C_2, \ldots C_n$) includes a plurality of secret keys ($SK_1, SK_2, \ldots SK_n$) encrypted with a key encryption key (KEK), and wherein the plurality of secret keys ($SK_1, SK_2, \ldots SK_n$) correspond to the plurality of public keys ($PK_1, PK_2, \ldots PK_n$); receive, a data chunk ($M_i$) for encryption; generate, a data encryption key (DEK) based on a hash function (H), a public key ($PK_i$) of the plurality of public keys ($PK_1, PK_2, \ldots PK_n$), and a random number (R); encrypt, the data chunk ($M_i$) with the DEK to generate an encrypted data chunk ($C_{Mi}$); generate, a header (Hdr) including a cipher ($C_i$) of the plurality of ciphers ($C_1, C_2, \ldots C_n$) corresponding to the public key ($PK_i$) of the plurality of public keys ($PK_1, PK_2, \ldots PK_n$) and key encapsulation data; store, in a database, a cipher text (CT) including the header (Hdr) and the encrypted data chunk ($C_{Mi}$); receive, a request to decrypt the cipher text (CT); in response to receiving a request to decrypt the cipher text (CT), provide, to a hardware security module (HSM), the cipher ($C_i$); receive, from the HSM, a secret key ($SK_i$) of the plurality of secret keys ($SK_1, SK_2, \ldots SK_n$) that corresponds to the public key ($PK_i$) of the plurality of public keys ($PK_1, PK_2, \ldots PK_n$) used to generate the DEK used to generate the encrypted data chunk ($C_{Mi}$); derive, based on the secret key ($SK_i$) received from the HSM and the key encapsulation data, the DEK used to generate the encrypted data chunk ($C_{Mi}$); and provide, the derived DEK for decrypting the encrypted data chunk ($C_{Mi}$) to obtain the data chunk ($M_i$).

Further embodiments or aspects are set forth in the following numbered clauses:

Clause 1. A computer-implemented method comprising: storing, with at least one processor, in memory, a plurality of ciphers ($C_1, C_2, \ldots C_n$) in association with a plurality of public keys ($PK_1, PK_2, \ldots PK_n$), wherein the plurality of ciphers ($C_1, C_2, \ldots C_n$) includes a plurality of secret keys ($SK_1, SK_2, \ldots SK_n$) encrypted with a key encryption key (KEK), and wherein the plurality of secret keys ($SK_1, SK_2, \ldots SK_n$) correspond to the plurality of public keys ($PK_1, PK_2, \ldots PK_n$); receiving, with at least one processor, a data chunk ($M_i$) for encryption; generating, with at least one processor, a data encryption key (DEK) based on a hash function (H), a public key ($PK_i$) of the plurality of public keys ($PK_1, PK_2, \ldots PK_n$), and a random number (R); encrypting, with at least one processor, the data chunk ($M_i$) with the DEK to generate an encrypted data chunk ($C_{Mi}$); generating, with at least one processor, a header (Hdr) including a cipher ($C_i$) of the plurality of ciphers ($C_1, C_2, \ldots C_n$) corresponding to the public key ($PK_i$) of the plurality of public keys ($PK_1, PK_2, \ldots PK_n$) and key encapsulation data; storing, with at least one processor, in a database, a cipher text (CT) including the header (Hdr) and the encrypted data chunk ($C_{Mi}$); receiving, with at least one processor, a request to decrypt the cipher text (CT); in response to receiving a request to decrypt the cipher text (CT), providing, with at least one processor, to a hardware security module (HSM), the cipher ($C_i$); receiving, with at least one processor, from the HSM, a secret key ($SK_i$) of the plurality of secret keys ($SK_1, SK_2, \ldots SK_n$) that corresponds to the public key ($PK_i$) of the plurality of public keys ($PK_1, PK_2, \ldots PK_n$) used to generate the DEK used to generate the encrypted data chunk ($C_{Mi}$); deriving, with at least one processor, based on the secret key ($SK_i$) received from the HSM and the key encapsulation data, the DEK used to generate the encrypted data chunk ($C_{Mi}$); and providing, with at least one processor, the derived DEK for decrypting the encrypted data chunk ($C_{Mi}$) to obtain the data chunk ($M_i$).

Clause 2. The computer-implemented method of clause 1, further comprising: receiving, with at least one processor, from the HSM, a plurality of random keys ($r_1, r_2, \ldots r_n$); generating, with at least one processor, based on a generator function (g) and the plurality of random keys ($r_1, r_2, \ldots r_n$), the plurality of public keys ($PK_1, PK_2, \ldots PK_n$); generating, with at least one processor, based on the hash function (H) and the plurality of public keys ($PK_1, PK_2, \ldots PK_n$), the plurality of secret keys ($SK_1, SK_2, \ldots SK_n$) that correspond to the plurality of public keys ($PK_1, PK_2, \ldots PK_n$); providing, with at least one processor, to the HSM, the plurality of secret keys ($SK_1, SK_2, \ldots SK_n$); and receiving, with at least one processor, from the HSM, the plurality of secret keys ($SK_1, SK_2, \ldots SK_n$) encrypted with the KEK as the plurality of ciphers ($C_1, C_2, \ldots C_n$).

Clause 3. The computer-implemented method of clauses 1 or 2, further comprising: after storing, in the memory, the plurality of ciphers ($C_1, C_2, \ldots C_n$) in association with the plurality of public keys ($PK_1, PK_2, \ldots PK_n$), deleting, with at least one processor, the plurality of secret keys ($SK_1, SK_2, \ldots SK_n$) and the plurality of random keys ($r_1, r_2, \ldots r_n$).

Clause 4. The computer-implemented method of any of clauses 1-3, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

Clause 5. The computer-implemented method of any of clauses 1-4, further comprising: receiving, with at least one processor, a further data chunk ($M_j$) for encryption; generating, with at least one processor, a further data encryption key (DEK') based on the hash function (H), a further public key ($PK_j$) of the plurality of public keys ($PK_1$, $PK_2$, ... $PK_n$), and a further random number (R); encrypting, with at least one processor, the further data chunk ($M_j$) with the further DEK' to generate a further encrypted data chunk ($C_{Mj}$); generating, with at least one processor, a further header (Hdr') including a further cipher ($C_j$) of the plurality of ciphers ($C_1$, $C_2$, ... $C_n$) corresponding to the further public key ($PK_j$) of the plurality of public keys ($PK_1$, $PK_2$, ... $PK_n$) and further key encapsulation data; storing, with at least one processor, in the database, a further cipher text (CT') including the further header (Hdr') and the further encrypted data chunk ($C_{Mj}$); receiving, with at least one processor, a request to decrypt the further cipher text (CT'); in response to receiving a request to decrypt the further cipher text (CT'), providing, with at least one processor, to the HSM, the further cipher ($C_j$); receiving, with at least one processor, from the HSM, a further secret key ($SK_j$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK' used to generate the further encrypted data chunk ($C_{Mj}$); deriving, with at least one processor, based on the further secret key ($SK_j$) received from the HSM and the further key encapsulation data, the further DEK' used to generate the further encrypted data chunk ($C_{Mj}$); and providing, with at least one processor, the further derived DEK for decrypting the further encrypted data chunk ($C_{Mj}$) to obtain the further data chunk ($M_i$).

Clause 6. The computer-implemented method of any of clauses 1-5, further comprising: generating, with at least one processor, a token based on the secret key ($SK_i$) and the further secret key ($SK_j$); deriving, with at least one processor, based on the token and the key encapsulation data, the DEK; and deriving, with at least one processor, based on the token and the further key encapsulation data, the further DEK'.

Clause 7. A computing system comprising: one or more processors programmed and/or configured to: store, in memory, a plurality of ciphers ($C_1$, $C_2$, ... $C_n$) in association with a plurality of public keys ($PK_1$, $PK_2$, ... $PK_n$), wherein the plurality of ciphers ($C_1$, $C_2$, ... $C_n$) includes a plurality of secret keys ($SK_1$, $SK_2$, ... $SK_n$) encrypted with a key encryption key (KEK), and wherein the plurality of secret keys ($SK_1$, $SK_2$, ... $SK_n$) correspond to the plurality of public keys ($PK_1$, $PK_2$, ... $PK_n$); receive, a data chunk ($M_i$) for encryption; generate, a data encryption key (DEK) based on a hash function (H), a public key ($PK_i$) of the plurality of public keys ($PK_1$, $PK_2$, ... $PK_n$), and a random number (R); encrypt, the data chunk ($M_i$) with the DEK to generate an encrypted data chunk ($C_{Mi}$); generate, a header (Hdr) including a cipher ($C_i$) of the plurality of ciphers ($C_1$, $C_2$, ... $C_n$) corresponding to the public key ($PK_i$) of the plurality of public keys ($PK_1$, $PK_2$, ... $PK_n$) and key encapsulation data; store, in a database, a cipher text (CT) including the header (Hdr) and the encrypted data chunk ($C_{Mi}$); receive, a request to decrypt the cipher text (CT); in response to receiving a request to decrypt the cipher text (CT), provide, to a hardware security module (HSM), the cipher ($C_i$); receive, from the HSM, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$); derive, based on the secret key ($SK_i$) received from the HSM and the key encapsulation data, the DEK used to generate the encrypted data chunk ($C_{Mi}$); and provide, the derived DEK for decrypting the encrypted data chunk ($C_{Mi}$) to obtain the data chunk ($M_i$).

Clause 8. The system of clause 7, wherein the one or more processors are further programmed and/or configured to: receive, from the HSM, a plurality of random keys ($r_1$, $r_2$, ... $r_n$); generate, based on a generator function (g) and the plurality of random keys ($r_1$, $r_2$, ... $r_n$), the plurality of public keys ($PK_1$, $PK_2$, ... $PK_n$); generate, based on the hash function (H) and the plurality of public keys ($PK_1$, $PK_2$, ... $PK_n$), the plurality of secret keys ($SK_1$, $SK_2$, ... $SK_n$) that correspond to the plurality of public keys ($PK_1$, $PK_2$, ... $PK_n$); provide, to the HSM, the plurality of secret keys ($SK_1$, $SK_2$, ... $SK_n$); and receive, from the HSM, the plurality of secret keys ($SK_1$, $SK_2$, ... $SK_n$) encrypted with the KEK as the plurality of ciphers ($C_1$, $C_2$, ... $C_n$).

Clause 9. The system of clauses 7 or 8, wherein the one or more processors are further programmed and/or configured to: after storing, in the memory, the plurality of ciphers ($C_1$, $C_2$, ... $C_n$) in association with the plurality of public keys ($PK_1$, $PK_2$, ... $PK_n$), delete the plurality of secret keys ($SK_1$, $SK_2$, ... $SK_n$) and the plurality of random keys ($r_1$, $r_2$, ... $r_n$).

Clause 10. The system of any of clauses 7-9, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

Clause 11. The system of any of clauses 7-10, wherein the one or more processors are further programmed and/or configured to: receive a further data chunk ($M_j$) for encryption; generate a further data encryption key (DEK') based on the hash function (H), a further public key ($PK_j$) of the plurality of public keys ($PK_1$, $PK_2$, ... $PK_n$), and a further random number (R); encrypt the further data chunk ($M_j$) with the further DEK' to generate a further encrypted data chunk ($C_{Mj}$); generate a further header (Hdr') including a further cipher ($C_j$) of the plurality of ciphers ($C_1$, $C_2$, ... $C_n$) corresponding to the further public key ($PK_j$) of the plurality of public keys ($PK_1$, $PK_2$, ... $PK_n$) and further key encapsulation data; store, in the database, a further cipher text (CT') including the further header (Hdr') and the further encrypted data chunk ($C_{Mj}$); receive, a request to decrypt the further cipher text (CT'); in response to receiving a request to decrypt the further cipher text (CT'), provide, to the HSM, the further cipher ($C_j$); receive, from the HSM, a further secret key ($SK_j$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK' used to generate the further encrypted data chunk ($C_{Mj}$); derive, based on the further secret key ($SK_j$) received from the HSM and the further key encapsulation data, the further DEK' used to generate the further encrypted data chunk ($C_{Mj}$); and provide the further derived DEK for decrypting the further encrypted data chunk ($C_{Mj}$) to obtain the further data chunk ($M_{ji}$).

Clause 12. The system of any of clauses 7-11, further comprising: generating a token based on the secret key ($SK_i$) and the further secret key ($SK_j$); deriving, based on the token and the key encapsulation data, the DEK; and deriving, based on the token and the further key encapsulation data, the further DEK'.

Clause 13. A computer program product comprising at least one non-transitory computer-readable medium including program instructions that, when executed by at least one processor, cause the at least one processor to: store, in memory, a plurality of ciphers ($C_1, C_2, \ldots C_n$) in association with a plurality of public keys ($PK_1, PK_2, \ldots PK_n$), wherein the plurality of ciphers ($C_1, C_2, \ldots C_n$) includes a plurality of secret keys ($SK_1, SK_2, \ldots SK_n$) encrypted with a key encryption key (KEK), and wherein the plurality of secret keys ($SK_1, SK_2, \ldots SK_n$) correspond to the plurality of public keys ($PK_1, PK_2, \ldots PK_n$); receive, a data chunk ($M_i$) for encryption; generate a data encryption key (DEK) based on a hash function (H), a public key ($PK_i$) of the plurality of public keys ($PK_1, PK_2, \ldots PK_n$), and a random number (R); encrypt the data chunk ($M_i$) with the DEK to generate an encrypted data chunk ($C_{Mi}$); generate a header (Hdr) including a cipher ($C_i$) of the plurality of ciphers ($C_1, C_2, \ldots C_n$) corresponding to the public key ($PK_i$) of the plurality of public keys ($PK_1, PK_2, \ldots PK_n$) and key encapsulation data; store, in a database, a cipher text (CT) including the header (Hdr) and the encrypted data chunk ($C_{Mi}$); receive a request to decrypt the cipher text (CT); in response to receiving a request to decrypt the cipher text (CT), provide to a hardware security module (HSM), the cipher ($C_i$); receive, from the HSM, a secret key ($SK_i$) of the plurality of secret keys ($SK_1, SK_2, \ldots SK_n$) that corresponds to the public key ($PK_i$) of the plurality of public keys ($PK_1, PK_2, \ldots PK_n$) used to generate the DEK used to generate the encrypted data chunk ($C_{Mi}$); derive, based on the secret key ($SK_i$) received from the HSM and the key encapsulation data, the DEK used to generate the encrypted data chunk ($C_{Mi}$); and provide, the derived DEK for decrypting the encrypted data chunk ($C_{Mi}$) to obtain the data chunk ($M_i$).

Clause 14. The computer program product of clause 13, wherein the instructions further cause the at least one processor to: receive, from the HSM, a plurality of random keys ($r_1, r_2, \ldots r_n$); generate, based on a generator function (g) and the plurality of random keys ($r_1, r_2, \ldots r_n$), the plurality of public keys ($PK_1, PK_2, \ldots PK_n$); generate, based on the hash function (H) and the plurality of public keys ($PK_1, PK_2, \ldots PK_n$), the plurality of secret keys ($SK_1, SK_2, \ldots SK_n$) that correspond to the plurality of public keys ($PK_1, PK_2, \ldots PK_n$); provide, to the HSM, the plurality of secret keys ($SK_1, SK_2, \ldots SK_n$); and receive, from the HSM, the plurality of secret keys ($SK_1, SK_2, \ldots SK_n$) encrypted with the KEK as the plurality of ciphers ($C_1, C_2, \ldots C_n$).

Clause 15. The computer program product of clauses 13 or 14, wherein the instructions further cause the at least one processor to: after storing, in the memory, the plurality of ciphers ($C_1, C_2, \ldots C_n$) in association with the plurality of public keys ($PK_1, PK_2, \ldots PK_n$), delete the plurality of secret keys ($SK_1, SK_2, \ldots SK_n$) and the plurality of random keys ($r_1, r_2, \ldots r_n$).

Clause 16. The computer program product of any of clauses 13-15, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

Clause 17. The computer program product of any of clauses 13-16, wherein the instructions further cause the at least one processor to: receive a further data chunk ($M_j$) for encryption; generate a further data encryption key (DEK') based on the hash function (H), a further public key ($PK_j$) of the plurality of public keys ($PK_1, PK_2, \ldots PK_n$), and a further random number (R); encrypt the further data chunk ($M_j$) with the further DEK' to generate a further encrypted data chunk ($C_{Mj}$); generate a further header (Hdr') including a further cipher ($C_j$) of the plurality of ciphers ($C_1, C_2, \ldots C_n$) corresponding to the further public key ($PK_j$) of the plurality of public keys ($PK_1, PK_2, \ldots PK_n$) and further key encapsulation data; store, in the database, a further cipher text (CT') including the further header (Hdr') and the further encrypted data chunk ($C_{Mj}$); receive a request to decrypt the further cipher text (CT'); in response to receiving a request to decrypt the further cipher text (CT'), provide, to the HSM, the further cipher ($C_j$); receive, from the HSM, a further secret key ($SK_j$) of the plurality of secret keys ($SK_1, SK_2, \ldots SK_n$) that corresponds to the further public key ($PK_j$) of the plurality of public keys ($PK_1, PK_2, \ldots PK_n$) used to generate the further DEK' used to generate the further encrypted data chunk ($C_{Mj}$); derive, based on the further secret key ($SK_j$) received from the HSM and the further key encapsulation data, the further DEK' used to generate the further encrypted data chunk ($C_{Mj}$); and provide, the further derived DEK for decrypting the further encrypted data chunk ($C_{Mj}$) to obtain the further data chunk ($M_j$).

Clause 18. The computer program product of any of clauses 13-17, wherein the instructions further cause the at least one processor to: generate a token based on the secret key ($SK_i$) and the further secret key ($SK_j$); derive, based on the token and the key encapsulation data, the DEK; and derive, based on the token and the further key encapsulation data, the further DEK'.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
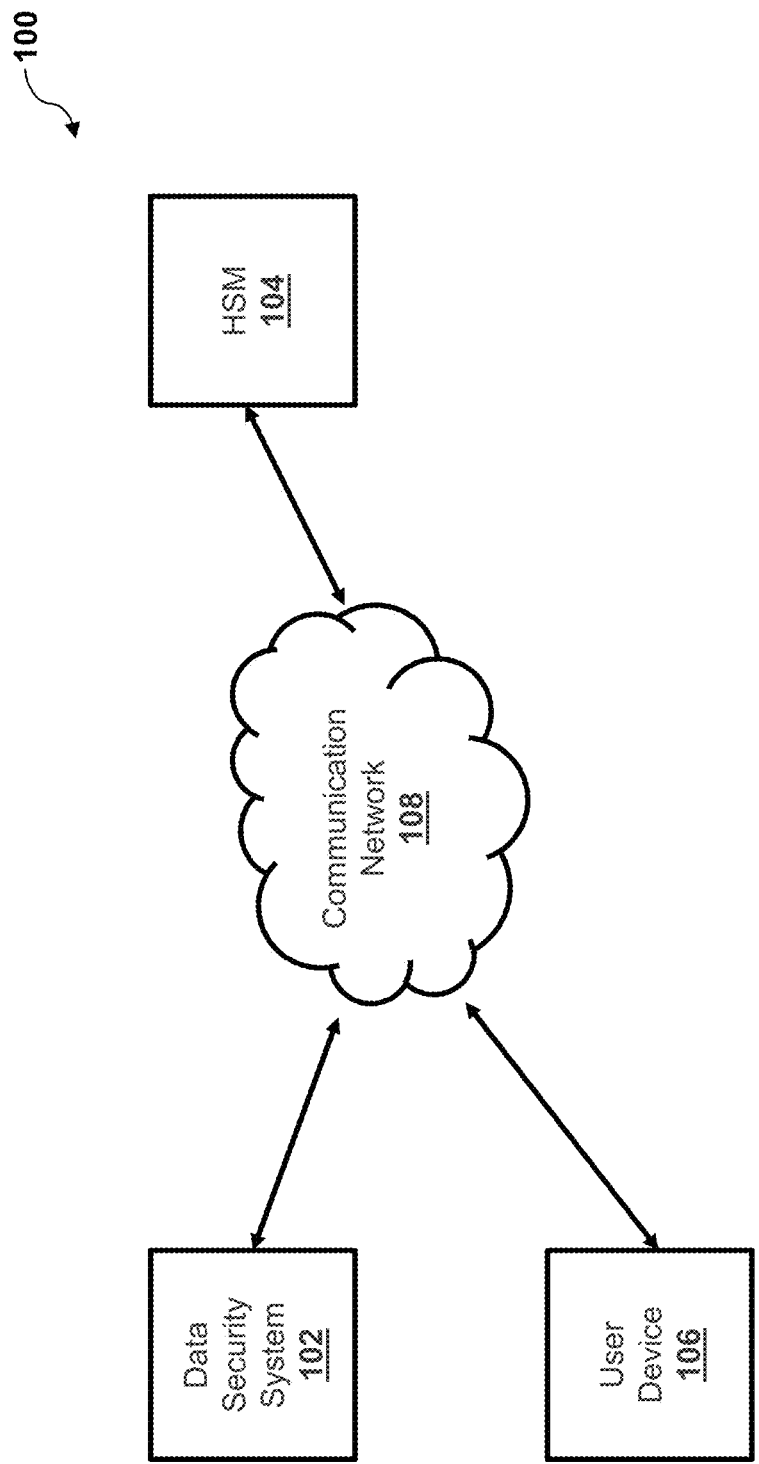
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Figure 5A:
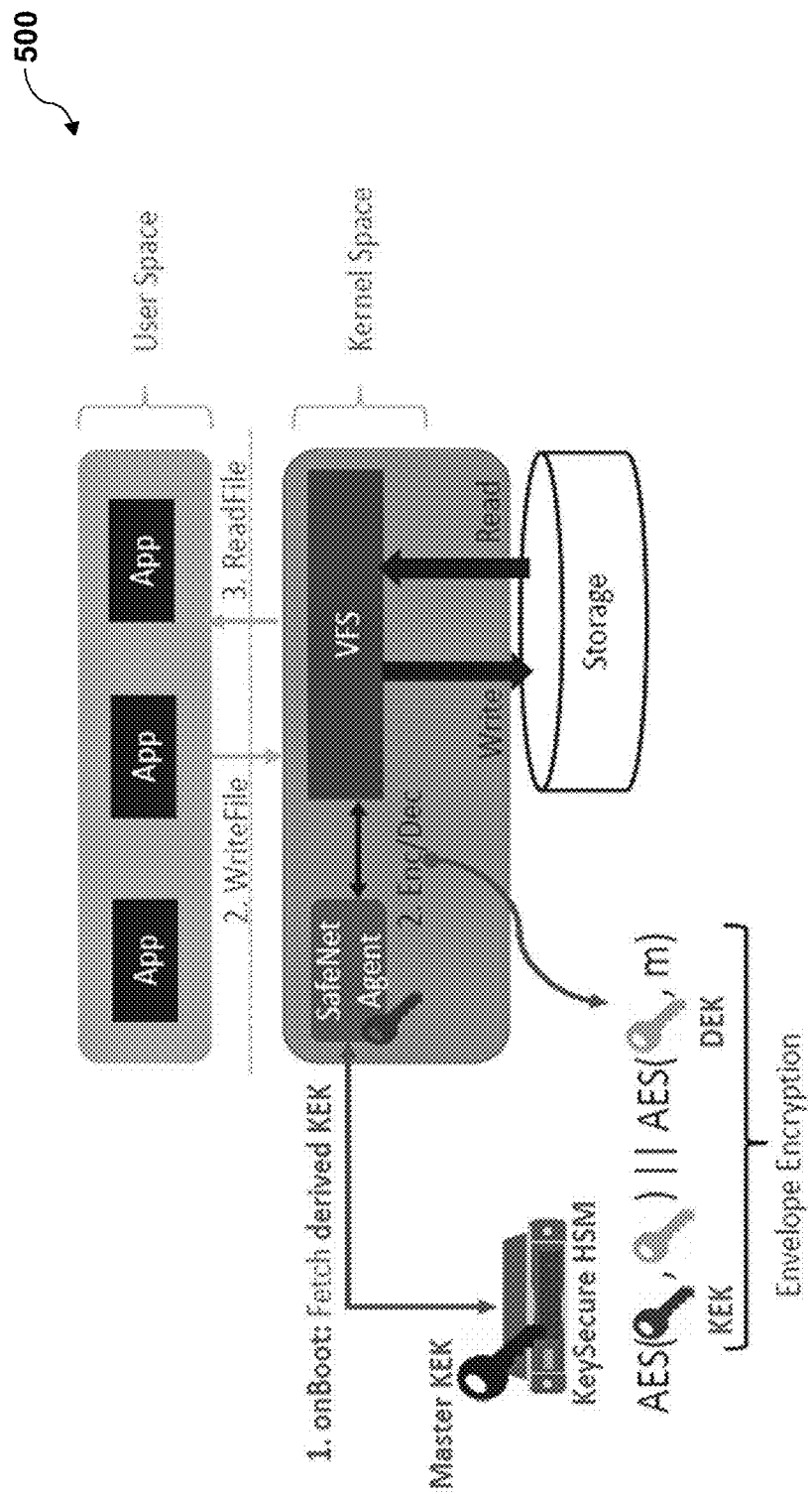
FIGS. 5A and 5B are diagrams of an existing data security system.
Figure 5B:
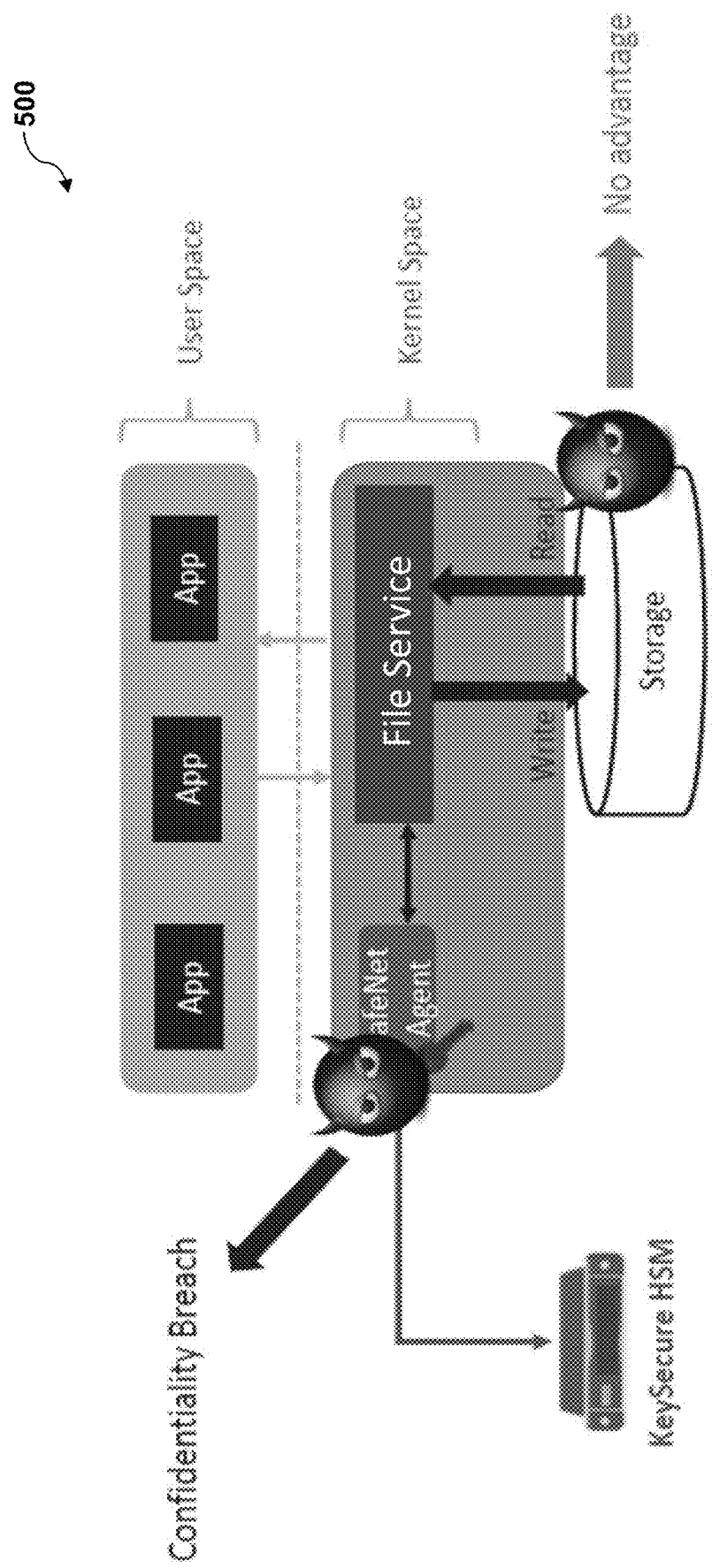

FIGS. 5A and 5B are diagrams of an existing data security system 500 that uses a SafeNet ProtectFile agent, a file service, and a KeySecure HSM to protect data-at-rest. This existing data security system 500 employs transparent encryption at the kernel level, which reduces an ability to apply kernel upgrades and/or security patches. This existing data security system 500 also uses the same key encryption key (KEK) (e.g., the same secret key, etc.) to protect each of the files (e.g., all of the data) created by the data security system 500 (e.g., created by a same node of the data security system, etc.), and the KEK lives in memory until a machine hosting the data security system (e.g., the SafeNet Protect-File agent, the file service, etc.) restarts. Accordingly, this existing data security system 500 lacks forward secrecy. Further, this existing data security system 500 invokes the HSM for each transaction, thereby resulting in the need for more and more HSMs, which are expensive and difficult to maintain and scale, to attempt to reduce operation overloads and/or file processing bottlenecks.

Non-limiting embodiments or aspects of the present disclosure provide for systems, methods, and computer program products that store, in memory, a plurality of ciphers $(C_1, C_2, \ldots C_n)$ in association with a plurality of public keys $(PK_1, PK_2, \ldots PK_n)$, wherein the plurality of ciphers $(C_1, C_2, \ldots C_n)$ includes a plurality of secret keys $(SK_1, SK_2, \ldots SK_n)$ encrypted with a key encryption key (KEK), and wherein the plurality of secret keys $(SK_1, SK_2, \ldots SK_n)$ correspond to the plurality of public keys $(PK_1, PK_2, \ldots PK_n)$; receive, a data chunk $(M_i)$ for encryption; generate, a data encryption key (DEK) based on a hash function (H), a public key $(PK_i)$ of the plurality of public keys $(PK_1, PK_2, \ldots PK_n)$, and a random number (R); encrypt, the data chunk $(M_i)$ with the DEK to generate an encrypted data chunk $(C_{Mi})$; generate, a header (Hdr) including a cipher $(C_i)$ of the plurality of ciphers $(C_1, C_2, \ldots C_n)$ corresponding to the public key $(PK_i)$ of the plurality of public keys $(PK_1, PK_2, \ldots PK_n)$ and key encapsulation data; store, in a database, a cipher text (CT) including the header (Hdr) and the encrypted data chunk $(C_{Mi})$; receive, a request to decrypt the cipher text (CT); in response to receiving a request to decrypt the cipher text (CT), provide, to a hardware security module (HSM), the cipher $(C_i)$; receive, from the HSM, a secret key $(SK_i)$ of the plurality of secret keys $(SK_1, SK_2, \ldots SK_n)$ that corresponds to the public key $(PK_i)$ of the plurality of public keys $(PK_1, PK_2, \ldots PK_n)$ used to generate the DEK used to generate the encrypted data chunk $(C_{Mi})$; derive, based on the secret key $(SK_i)$ received from the HSM and the key encapsulation data, the DEK used to generate the encrypted data chunk $(C_{Mi})$; and provide, the derived DEK for decrypting the encrypted data chunk $(C_{Mi})$ to obtain the data chunk $(M_i)$.

In this way, non-limiting embodiments or aspects of the present disclosure enable data security that (i) is more secure with forward secrecy, (ii) uses an ephemeral KEK and data encryption key (DEK) for check data chunk (e.g., for each file, for each chunk of a file, etc.) and a new or different secret key for each data chunk or file that avoids keeping secrets (e.g., KEKs, secret keys, etc.) in memory for prolonged or extended periods of time, (iii) provides local encryption without a need to invoke an HSM (e.g., encryption is not dependent on HSM availability, etc.), (iv) enables faster key rotation, and/or (v) avoids the need to add additional HSMs to reduce operation overloads and/or file processing bottlenecks as a number of transactions or files to be processed and stored increases.

Referring now to FIG. 1, FIG. 1 is a diagram of an example environment 100 in which devices, systems, methods, and/or products described herein, may be implemented. As shown in FIG. 1, environment 100 may include data security system 102, hardware security module (HSM) 104, user device 106, and/or communication network 108. Data security system 102, hardware security module (HSM) 104, and/or user device 106 may interconnect (e.g., establish a connection to communicate, etc.) via wired connections, wireless connections, or a combination of wired and wireless connections.

Data security system 102 may include one or more devices capable of receiving information and/or data from HSM 104 and/or user device 106 (e.g., via communication network 108, etc.) and/or communicating information and/or data to HSM 104 and/or user device 106 (e.g., via communication network 108, etc.). For example, data security system 102 may include a computing device, such as a server, a group of servers, a client device, a group of client devices, and/or other like devices. In some non-limiting embodiments or aspects, data security system 102 may be associated with a transaction service provider as described herein.

HSM 104 may include one or more devices capable of receiving information and/or data from data security system 102 and/or user device 106 (e.g., via communication network 108, etc.) and/or communicating information and/or data to data security system 102 and/or user device 106 (e.g., via communication network 108, etc.). For example, HSM 104 may include a computing device, such as a server, a group of servers, a client device, a group of client devices, and/or other like devices. In some non-limiting embodiments or aspects, HSM 104 may include a KeySecure HSM.

User device 106 may include one or more devices capable of receiving information and/or data from data security system 102 and/or HSM 104 (e.g., via communication network 108, etc.) and/or communicating information and/or data to data security system 102 and/or HSM 104 (e.g., via communication network 108, etc.). For example, user device 106 may include a client device and/or the like. In some non-limiting embodiments or aspects, user device 106 may provide a user interface to a user for accessing and/or controlling data security system 102 (e.g., for accessing and/or controlling an application of data security system 102, etc.).

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1.

Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
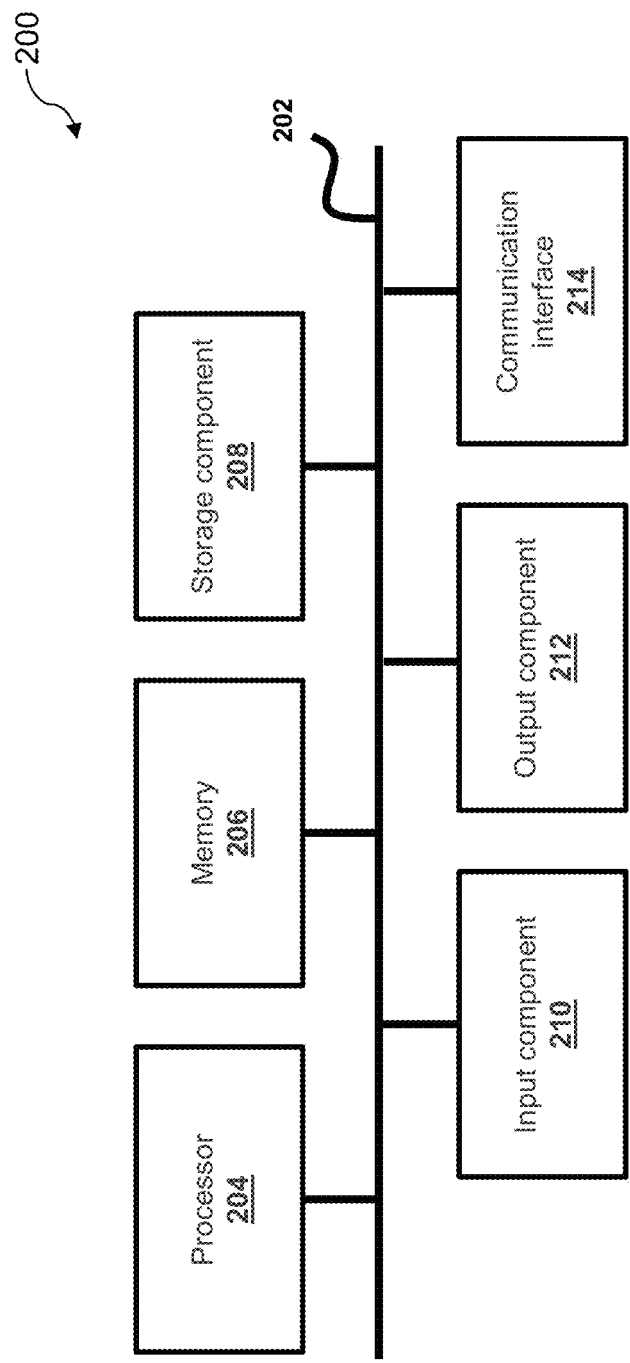
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to one or more devices of data security system 102, HSM 104 (e.g., one or more devices of a system of HSM 104, etc.), and/or user device 106 (e.g., one or more devices of a system of user device 106, etc.). In some non-limiting embodiments or aspects, one or more devices of data security system 102, HSM 104 (e.g., one or more devices of a system of HSM 104, etc.), and/or user device 106 (e.g., one or more devices of a system of user device 106, etc.) may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
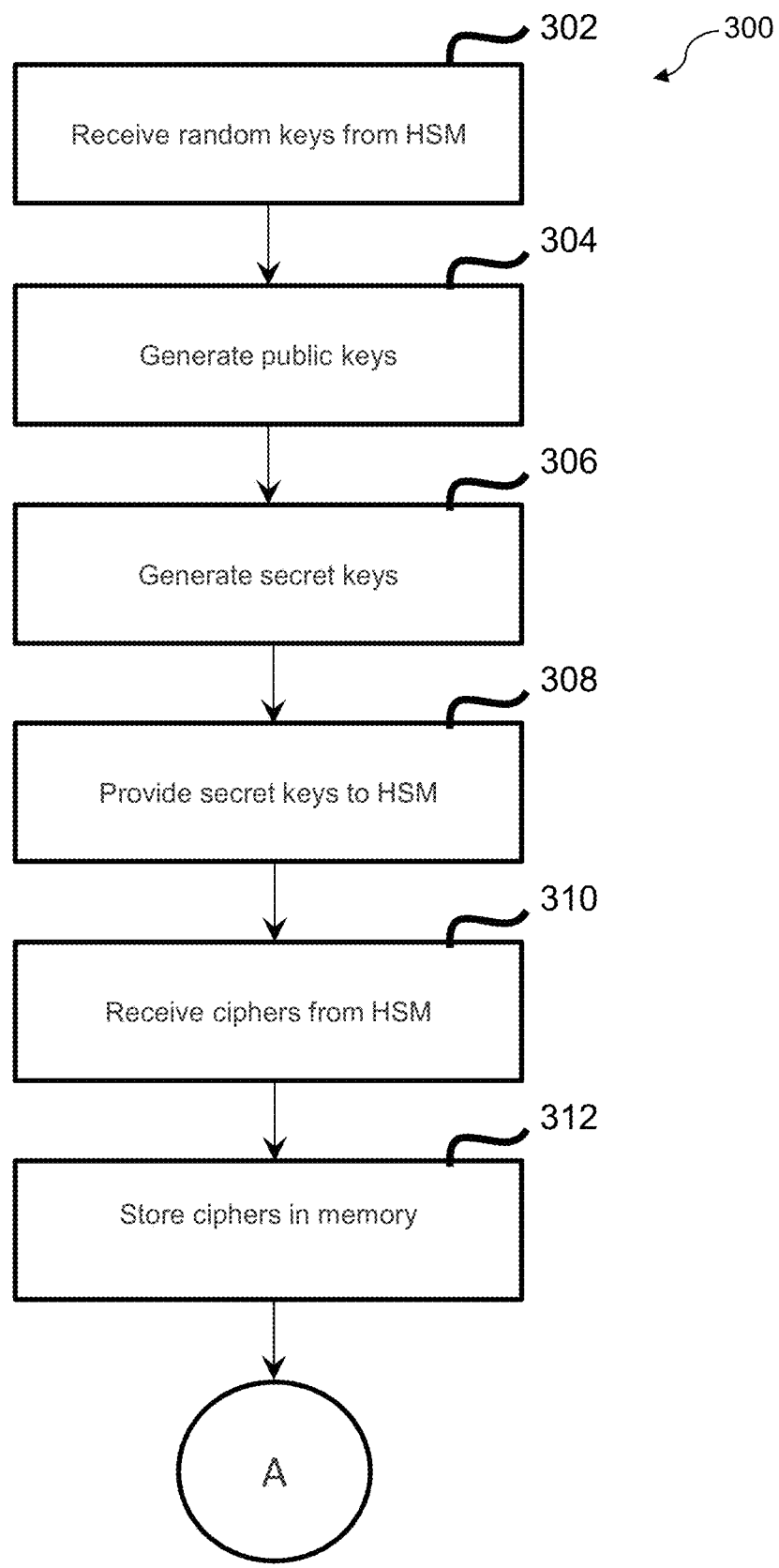
FIGS. 3A-3C are a flowchart of non-limiting embodiments or aspects of a process for data security.
Figure 3B:
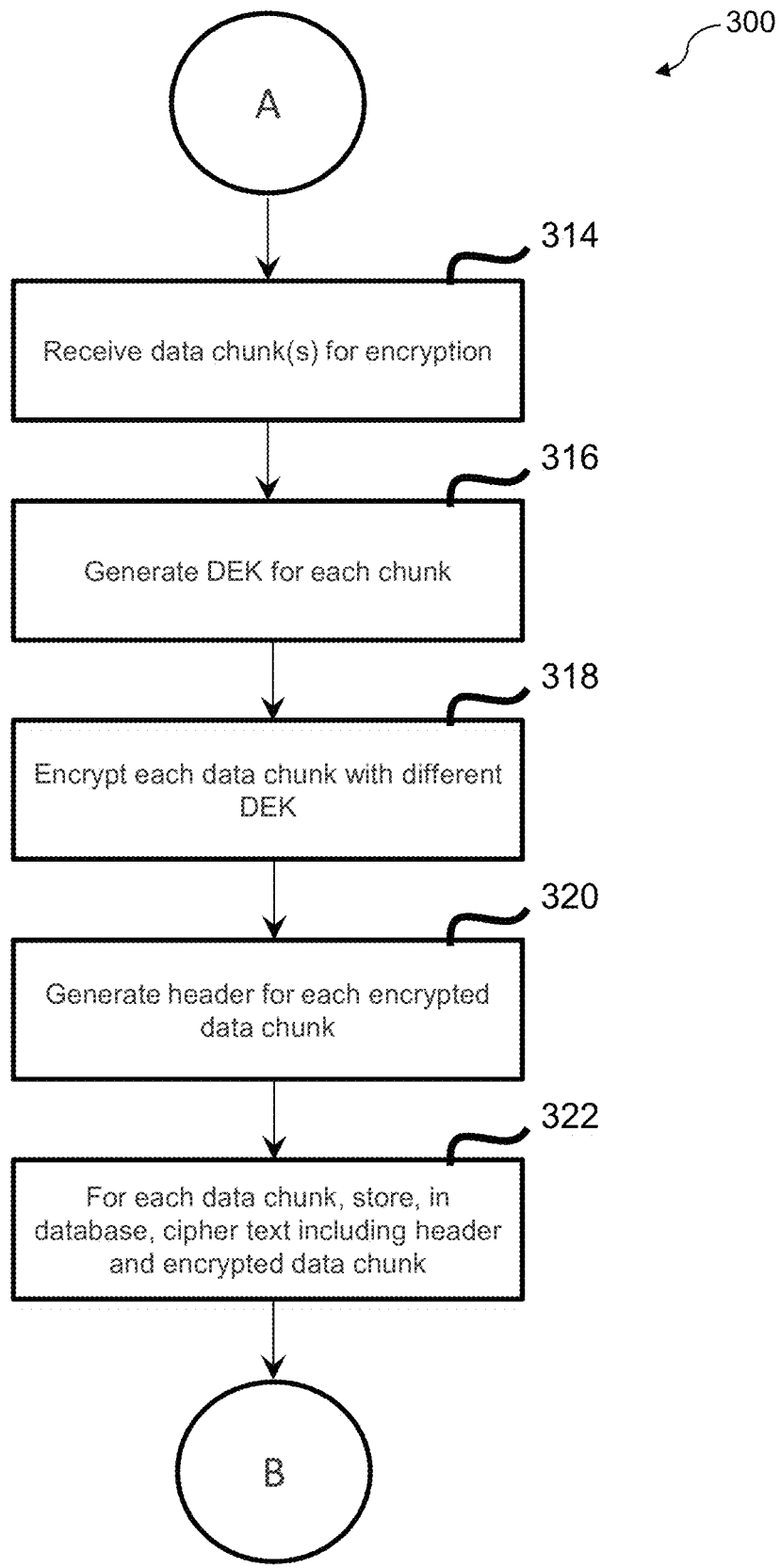
Figure 3C:
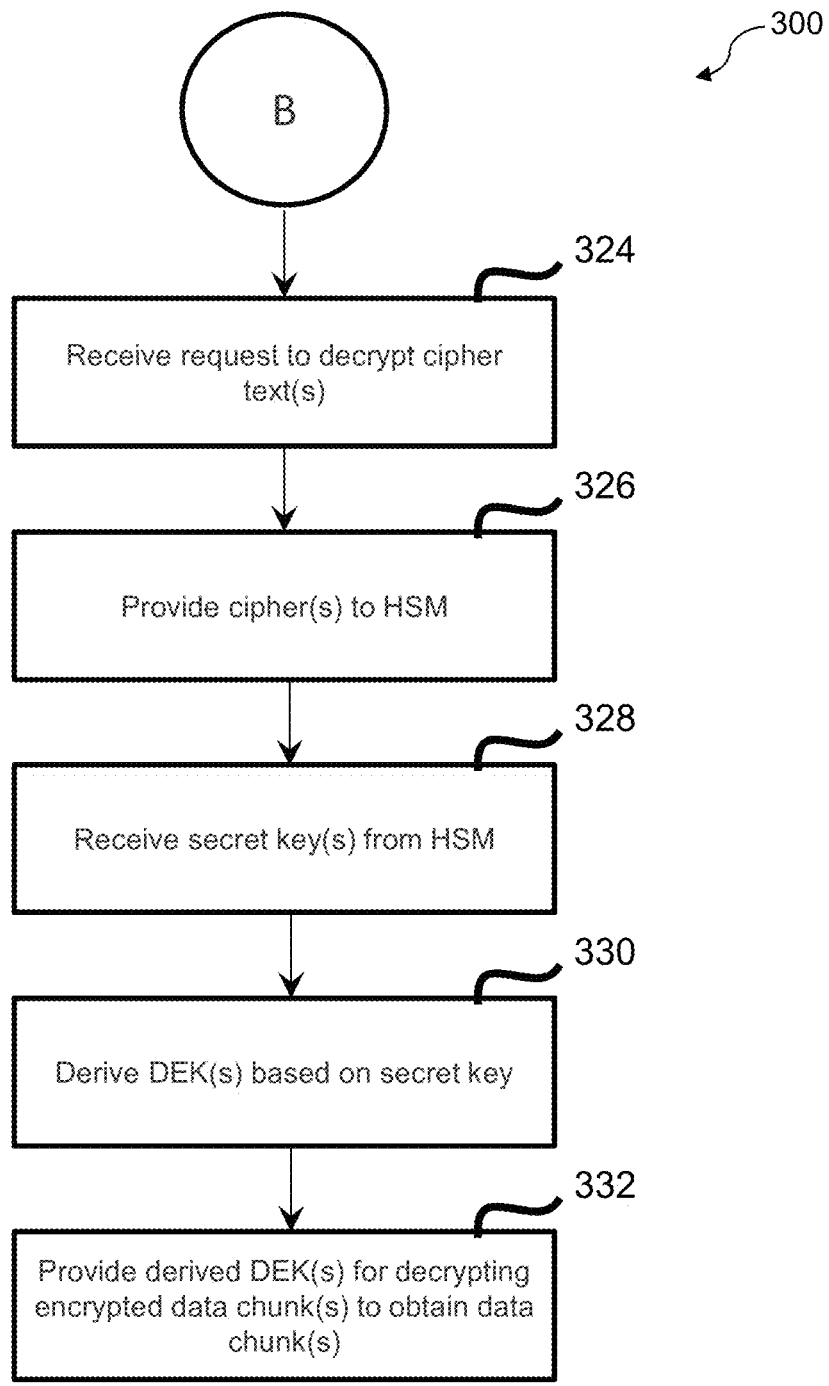
Figure 4A:
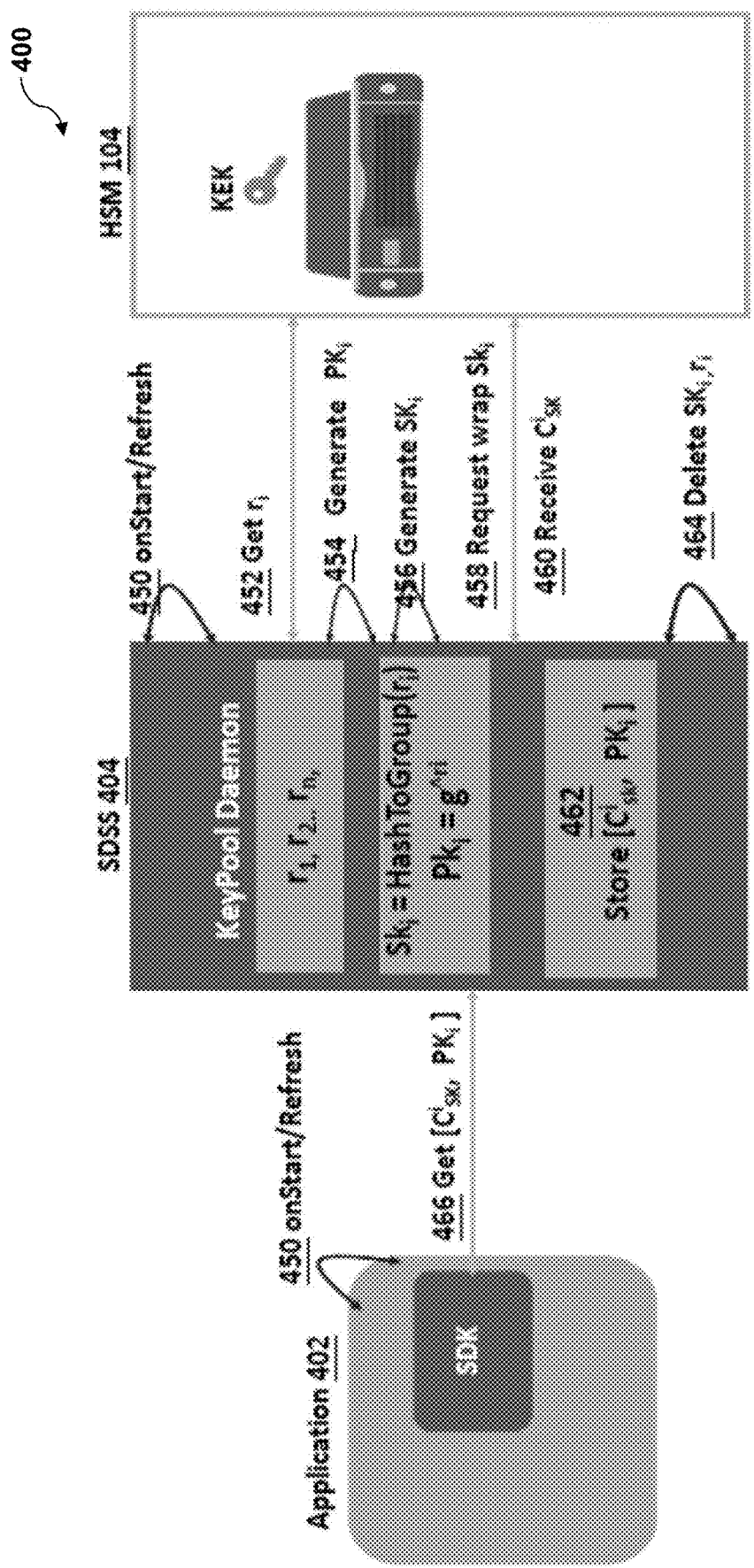
FIGS. 4A-4C are diagrams of an implementation of non-limiting embodiments or aspects of a system for data security.
Figure 4B:
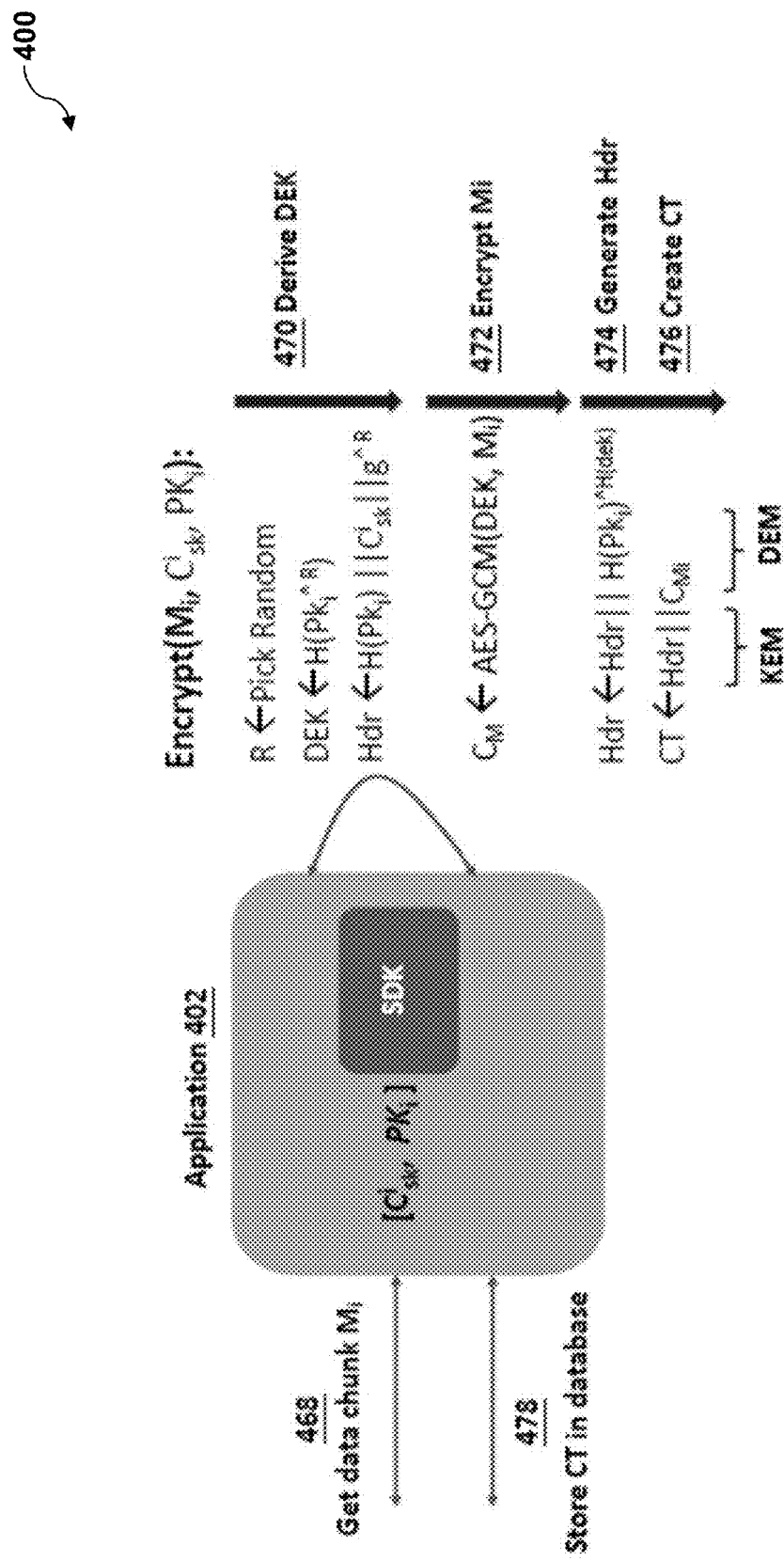
Figure 4C:
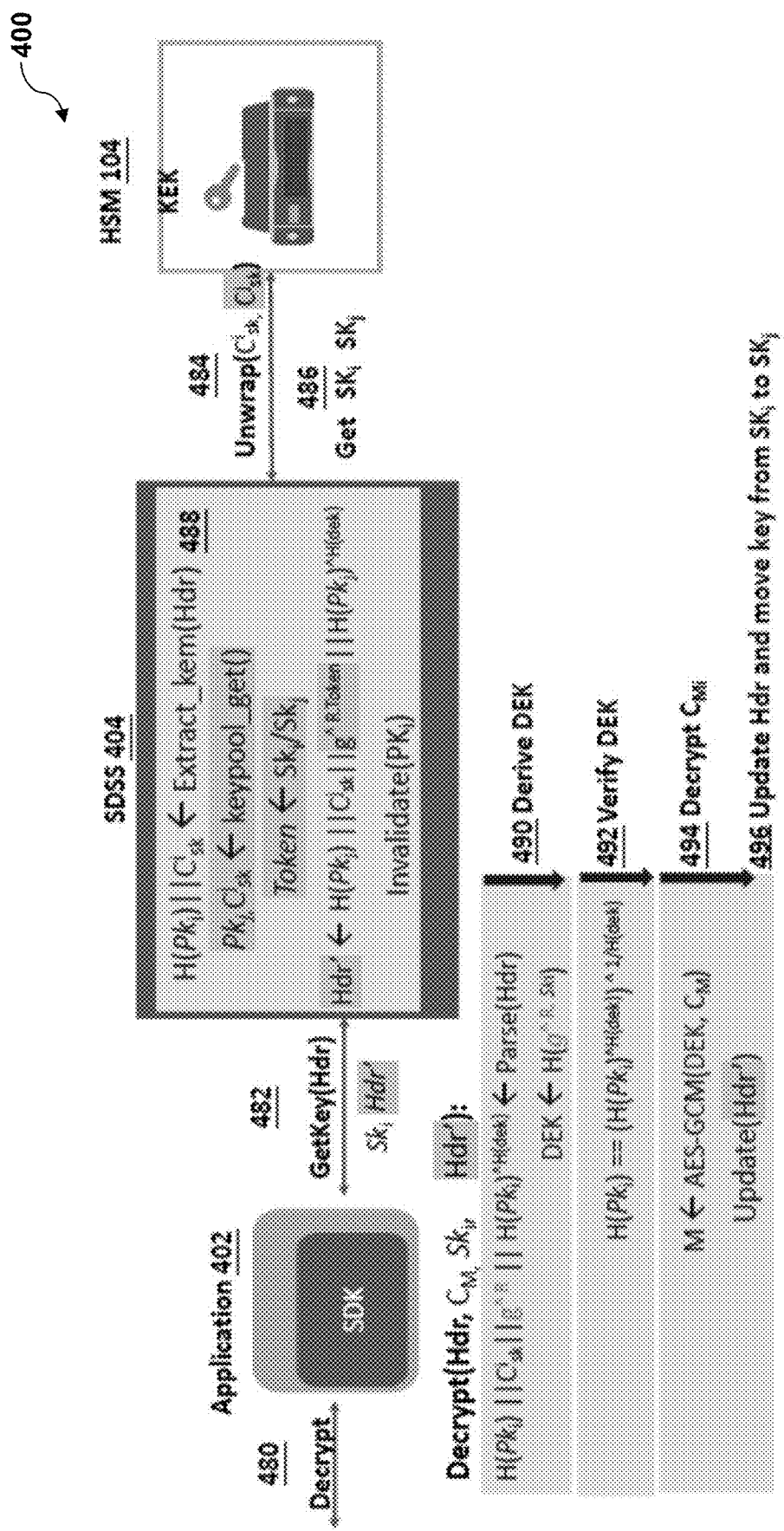

Referring now to FIGS. 3A-3C and 4A-4C, FIGS. 3A-3C are a flowchart of non-limiting embodiments or aspects of a process 300 for data security, and FIGS. 4A-4C are diagrams of non-limiting embodiments or aspects of an implementation 400 relating to a system for data security. As shown in FIGS. 4A-4C, implementation 400 includes application 402, scalable data security service (SDSS) 404, and HSM 104. In some non-limiting embodiments or aspects, one or more of the steps of process 300 may be performed (e.g., completely, partially, etc.) by data security system 102 (e.g., one or more devices of data security system 102, etc.). For example, one or more of the steps of process 300 may be performed (e.g., completely, partially, etc.) by SDSS 404 of data security system 102. As an example, one or more of the steps of process 300 may be performed (e.g., completely, partially, etc.) by application 402 of data security system 102. In some non-limiting embodiments or aspects, one or more of the steps of process 300 may be performed (e.g., completely, partially, etc.) by another device or a group of devices separate from or including data security system 102, such as, HSM 104 (e.g., one or more devices of a system of HSM 104, etc.) and/or user device 106 (e.g., one or more devices of a system of user device 106, etc.).

As shown in FIG. 3A, at step 302, process 300 includes receiving random keys from an HSM. For example, data security system 102 (e.g., SDSS 404, etc.) may receive, from HSM 104, a plurality of random keys ($r_1, r_2, \ldots r_n$). As an example, and as shown at reference number 450 of FIG. 4A, application 402 and SDSS 404 may be started (e.g., launched, refreshed, initiated, etc.), and, at reference number 452, a KeyPool Daemon in SDSS 404 may request and receive the plurality of random keys ($r_1, r_2, \ldots r_n$), for example, a batch of random numbers, from HSM 104. The KeyPool Daemon may automatically request a new batch of random numbers whenever a pool of available ciphers or DEKs needs to be refreshed (e.g., when an available number of ciphers or DEKS satisfies a threshold number, etc.).

As shown in FIG. 3A, at step 304, process 300 includes generating public keys. For example, data security system 102 (e.g., SDSS 404, etc.) may generate, based on a generator function (g) and the plurality of random keys ($r_1, r_2, \ldots r_n$), a plurality of public keys ($PK_1, PK_2, \ldots PK_n$). As an example, and as shown at reference number 454 of FIG. 4A, SDSS 404 may generate a public key $PK_i$ according to the following Equation (1):

$$PK_i = g^{r_i} \quad (1)$$

where $PK_i$ is a public key of the plurality of public keys ($PK_1, PK_2, \ldots PK_n$), g is the generator function of a group G, and $r_1$ is a random key of the plurality of random keys ($r_1, r_2, \ldots r_n$).

As shown in FIG. 3A, at step 306, process 300 includes generating secret keys. For example, data security system 102 (e.g., SDSS 404, etc.) may generate, based on a hash function (H) and the plurality of public keys ($PK_1, PK_2, \ldots PK_n$), a plurality of secret keys ($SK_1, SK_2, \ldots SK_n$) that correspond to the plurality of public keys ($PK_i, PK_2, \ldots PK_n$). As an example, and as shown at reference number 456 of FIG. 4A, SDSS 404 may generate a secret key $SK_i$ according to the following Equation (2)

$$SK_i = \text{HashToGroup}(r_i)$$

$$PK_i = g^{r_i} \quad (2)$$

where $SK_i$ is a secret key of the plurality of secret keys ($SK_i, SK_2, \ldots SK_n$), HashToGroup is the hash function H applied to a group G of the plurality of random keys ($r_1, r_2, \ldots r_n$), $r_1$ is a random key of the plurality of random keys ($r_1, r_2, \ldots r_n$), and g is the generator function of the group G.

As shown in FIG. 3A, at step 308, process 300 includes providing secret keys to an HSM. For example, data security system 102 (e.g., SDSS 404, etc.) may provide, to the HSM 104, the plurality of secret keys ($SK_1, SK_2, \ldots SK_n$). As an example, and as shown at reference number 458 of FIG. 4A, SDSS 404 may provide, to HSM 104, the plurality of secret keys ($SK_1, SK_2, \ldots SK_n$) with a request to wrap the secret keys. In such an example, HSM 104 may encrypt the plurality of secret keys ($SK_1, SK_2, \ldots SK_n$) with a key encryption key (KEK) to generate a plurality of ciphers ($C_1, C_2, \ldots C_n$) (e.g., a plurality of wrapped secret keys, etc.).

As shown in FIG. 3A, at step 310, process 300 includes receiving ciphers from an HSM. For example, data security system 102 (e.g., SDSS 404, etc.) may receive, from HSM 104, the plurality of secret keys ($SK_1, SK_2, \ldots SK_n$) encrypted with the KEK as the plurality of ciphers ($C_1, C_2, \ldots C_n$). As an example, and as shown at reference number 460 of FIG. 4A, SDSS 404 may receive, from HSM 104, the plurality of secret keys ($SK_1, SK_2, \ldots SK_n$) encrypted with the KEK as the plurality of ciphers ($C_1, C_2, \ldots C_n$).

As shown in FIG. 3A, at step 312, process 300 includes storing ciphers in memory. For example, data security system 102 (e.g., SDSS 404, etc.) may store, in memory, the plurality of ciphers ($C_1, C_2, \ldots C_n$) in association with the plurality of public keys ($PK_1, PK_2, \ldots PK_n$). For example, the plurality of ciphers ($C_1, C_2, \ldots C_n$) may include the plurality of secret keys ($SK_1, SK_2, \ldots SK_n$) encrypted with the KEK, and the plurality of secret keys ($SK_1, SK_2, \ldots SK_n$) may correspond to the plurality of public keys ($PK_1, PK_2, \ldots PK_n$). As an example, a cipher $C^i_{SK}$ of the plurality of ciphers ($C_1, C_2, \ldots C_n$) may be stored in memory in association with a corresponding public key $PK_i$ of the plurality of public keys ($PK_1, PK_2, \ldots PK_n$). In such an example, and as shown at reference number 462 of FIG. 4A, SDSS 404 may store, in memory, the plurality of ciphers ($C_1, C_2, \ldots C_n$) in association with the plurality of public keys ($PK_1, PK_2, \ldots PK_n$).

As shown at reference number 464 of FIG. 4A, SDSS 404 may delete the plurality of secret keys ($SK_1, SK_2, \ldots SK_n$) and/or the plurality of random keys ($r_1, r_2, \ldots r_n$) immediately after step 306, immediately after step 308, immediately after step 310, or immediately after step 312 of process 300. For example, the plurality of secret keys ($SK_1, SK_2, \ldots SK_n$) and/or the plurality of random keys ($r_1, r_2, \ldots r_n$) may not be stored in memory for a prolonged period of time (e.g., only for the time needed to generate the secret keys and/or provide the secret keys to the HSM for wrapping, etc.). Accordingly, data security is improved by reducing an amount of time that secrets are kept in memory.

As shown at reference number 466 of FIG. 4A, application 402 may request and receive, from SDSS 404, one or more of the cipher and public key pairs [$C^i_{SK}$, $PK_i$] stored in the memory. For example, application 402 may request and receive from SDSS 404, one or more of the cipher and public key pairs [$C^i_{SK}$, $PK_i$] for encrypting one or more data files and/or one or more chunks of a data file. In some non-limiting embodiments or aspects, access to and/or control of application 402 on data security system 102 may be provided via user device 106 (e.g., via a user interface of user device 106, etc.).

As shown in FIG. 3B, at step 314, process 300 includes receiving data chunk(s) for encryption. For example, data security system 102 (e.g., application 402, SDSS 404, etc.) may receive a data chunk ($M_i$) for encryption. As an example, data security system 102 (e.g., application 402, SDSS 404, etc.) may receive a further data chunk ($M_j$) for encryption. In such an example, and as shown at reference number 468 in FIG. 4B, application 402 may receive a data chunk ($M_i$) (and/or a further data chunk ($M_j$), etc.) for encryption.

In some non-limiting embodiments or aspects, a data chunk may include a portion of a data file. For example, application 402 may chunk or segment a data file or a larger data chunk in to a plurality of data chunks. As an example, application 402 may chunk a 10 Kb file into ten 1 Kb data chunks. In such an example, application 402 may use a different cipher and public key pair [$C^i_{SK}$, $PK_i$] to encrypt each data chunk of the plurality of data chunks. For example, application 402 may use a cipher and public key pair [$C^i_{SK}$, $PK_i$] to derive a DEK to encrypt the data chunk ($M_i$) and a further cipher and public key pair [$C^j_{SK}$, $PK_j$] different than the cipher and public key pair [$C^i_{SK}$, $PK_i$] to derive a further DEK (e.g., DEK') to encrypt the further data chunk ($M_j$) as described in more detail herein below. Accordingly, if even a cipher and public key pair [$C^i_{SK}$, $PK_i$] is compromised, the entire file or each data chunk is still not recoverable by a malicious party because each data chunk is encrypted based on a different cipher and public key pair [$C^i_{SK}$, $PK_i$].

As shown in FIG. 3B, at step 316, process 300 includes generating a DEK for each data chunk. For example, data security system 102 (e.g., application 402, SDSS 404, etc.) may generate a DEK based on a hash function (H), a public key ($PK_i$) of the plurality of public keys ($PK_1$, $PK_2$, . . . $PK_n$), and a random number (R). As an example, data security system 102 (e.g., application 402, SDSS 404, etc.) may generate a further DEK (e.g., DEK') based on the hash function (H), a further public key ($PK_j$) of the plurality of public keys ($PK_1$, $PK_2$, . . . $PK_n$), and a further random number (R). In such an example, and as shown at reference number 470 in FIG. 4B, application 402 may derive or generate a DEK according to the following equation (3):

$$DEK = H(PK_i^R) \quad (3)$$

where H is the hash function, $PK_i$ is a public key of the plurality of public keys ($PK_1$, $PK_2$, . . . $PK_n$), and R is a random number.

As shown in FIG. 3B, at step 318, process 300 includes encrypting each data chunk with a different DEK. For example, data security system 102 (e.g., application 402, SDSS 404, etc.) may encrypt the data chunk ($M_i$) with a DEK to generate an encrypted data chunk ($C_{Mi}$). As an example, data security system 102 (e.g., application 402, SDSS 404, etc.) may encrypt the further data chunk ($M_j$) with a further DEK different than the DEK to generate a further encrypted data chunk ($C_{Mj}$). In such an example, and as shown at reference number 472 in FIG. 4B, application 402 may encrypt the data chunk ($M_i$) (and/or the further data chunk ($M_j$), etc.) with the DEK (and/or the further DEK, etc.) to generate an encrypted data chunk ($C_{Mi}$) (and/or a further encrypted data chunk ($C_{Mj}$), etc.). In some non-limiting embodiments or aspects, application 402 may encrypt a data chunk ($M_i$) using Advanced Standard Encryption with Galois/Counter Mode (AES-GCM) encryption techniques. Accordingly, as previously noted, even if a DEK is compromised, an entire file or each data chunk encrypted by an application is still not recoverable by a malicious party because each data chunk is encrypted by a different DEK.

As shown in FIG. 3B, at step 320, process 300 includes generating a header for each encrypted data chunk. For example, data security system 102 (e.g., application 402, SDSS 404, etc.) may generate a header (Hdr) including a cipher ($C_i$) of the plurality of ciphers ($C_1$, $C_2$, . . . $C_n$) corresponding to the public key ($PK_i$) of the plurality of public keys ($PK_1$, $PK_2$, . . . $PK_n$) and key encapsulation data. As an example, data security system 102 (e.g., application 402, SDSS 404, etc.) may generate a further header (Hdr') including a further cipher ($C_j$) of the plurality of ciphers ($C_1$, $C_2$, . . . $C_n$) corresponding to the further public key ($PK_j$) of the plurality of public keys ($PK_1$, $PK_2$, . . . $PK_n$) and further key encapsulation data. In such an example, and as shown at reference number 474 in FIG. 4B, application 402 may generate the header (Hdr) (and/or the further header (Hdr')) including the cipher ($C_i$) (and/or the cipher ($C_j$)) and the key encapsulation data.

In some non-limiting embodiments or aspects, key encapsulation data for an encrypted data chunk ($C_{Mj}$) may include the hash of the corresponding public key $H(PK_i)$, the corresponding cipher ($C_i$), a generator function of the random number $g^R$, the hash of the corresponding public key raised to a power of the hash (H) of the corresponding DEK $H(PK_i)^{H(DEK)}$, or any combination thereof. For example, the header (Hdr) may be represented as $H(PK_i) \| (C_i) \| g^R \|$ $H(PK_i)^{H(DEK)}$. Similarly, the further header (Hdr') may be represented as $H(PK_j) \| (C_j) \| g^R \| H(PKj)^{H(DEK')}$.

As shown in FIG. 3B, at step 322, process 300 includes for each data chunk, storing, in a database, a cipher text including a header and an encrypted data chunk. For example, data security system 102 (e.g., application 402, SDSS 404, etc.) may store, in a database, a cipher text (CT) including the header (Hdr) and the encrypted data chunk ($C_{Mi}$). As an example, data security system 102 (e.g., application 402, SDSS 404, etc.) may store, in the database, a further cipher text (CT') including the further header (Hdr') and the further encrypted data chunk ($C_{Mj}$). In such an example, and as shown at reference numbers 476 and 478 in FIG. 4B, application 402 may create and store, in a database, a cipher text (CT) (and/or a further cipher text (CT')) including the header (Hdr) and the encrypted data chunk ($C_{Mi}$) (and/or the further header (Hdr')) and the further encrypted data chunk ($C_{Mj}$). For example, a header (e.g., Hdr, Hdr', etc.) may function as and/or be referred to as a key encapsulation mechanism (KEM) and the encrypted data chunk (e.g., $C_{Mi}$, $C_{Mi}$, etc.) may function as and/or be referred to as a data encapsulation mechanism (DEM).

As shown in FIG. 3C, at step 324, process 300 includes receiving a request to decrypt a cipher text(s). For example, data security system 102 (e.g., application 402, SDSS 404, etc.) may receive a request to decrypt the cipher text (CT). As an example, data security system 102 (e.g., application 402, SDSS 404, etc.) may receive a request to decrypt the further cipher text (CT'). In such an example, and as shown at reference numbers 480 and 482 in FIG. 4C, application 402 may provide, to SDSS 404, a request for the secret key(s) to decrypt the cipher text (CT) (and/or the further cipher text (CT')) that includes the header (Hdr) (and/or the further header (Hdr')) of the cipher text (CT) (and/or the further cipher text (CT')). For example, a request to decrypt a batch or set of cipher texts may be received, and a request for the secret keys for decrypting each of the cipher texts in the batch or set may be provided to SDSS 404.

As shown in FIG. 3C, at step 326, process 300 includes providing a cipher(s) to a HSM. For example, data security system 102 (e.g., application 402, SDSS 404, etc.) may, in response to receiving a request to decrypt the cipher text (CT), provide to the HSM 104, the cipher ($C_i$). As an example, data security system 102 (e.g., application 402, SDSS 404, etc.) may, in response to receiving a request to decrypt the further cipher text (CT'), provide, to the HSM 104, the further cipher (C). In such an example, and as shown at reference number 484 of FIG. 4C, SDSS 404 may extract the cipher ($C_i$) (and/or the cipher ($C_j$)) from the header (Hdr) (and/or the further header (Hdr')) and provide, to HSM 104, the extracted ciphers ($C_i$, $C_i$) with a request to unwrap the ciphers ($C_i$, $C_i$) to recover the secret keys ($SK_i$, $SK_j$). For example, a request to unwrap a batch or set of extracted ciphers may be provided to HSM 104. As an example, HSM 104 may decrypt the ciphers ($C_i$, $C_1$) with the KEK to obtain the secret keys ($SK_i$, $SK_j$). Accordingly, instead of sending an entire file to HSM 104 for decryption or encrypting an entire file with a single header, which increases operation overhead and processing time, non-limiting embodiments or aspects of the present disclosure may send only the extracted cipher to the HSM 104 for decryption, with each data chunk of a file having a different header/cipher for encryption, which increases operation overhead and processing time and improves security by providing for forward secrecy.

As shown in FIG. 3C, at step 328, process 300 includes receiving a secret key(s) from a HSM. For example, data security system 102 (e.g., application 402, SDSS 404, etc.) may receive, from the HSM 104, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$). As an example, data security system 102 (e.g., application 402, SDSS 404, etc.) may receive, from the HSM 104, a further secret key ($SK_j$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK (e.g., DEK') used to generate the further encrypted data chunk ($C_{Mj}$). In such an example, and as shown at reference number 486 of FIG. 4C, SDSS 404 may receive, from HSM 104, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$) and/or a further secret key ($SK_j$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK (e.g., DEK') used to generate the further encrypted data chunk ($C_{Mj}$). For example, SDSS 404 may receive, from HSM 104, a batch or set of secret keys corresponding to the batch or set of ciphers submitted for unwrapping.

In some non-limiting embodiments or aspects, and as shown at reference number 488 of FIG. 4C, SDSS 404 may generate a token based on the secret key ($SK_i$) and the further secret key ($SK_j$) and provide the token to application 402 for deriving, based on the token and the key encapsulation data the DEK, and deriving, based on the token and the further key encapsulation data, the further DEK'. For example, the token may include the secret key ($SK_i$) and the further secret key ($SK_j$) (e.g., each secret key in the batch or set of secret keys requested from HSM 104, each secret key corresponding to the batch or set of data chunks provided for decryption by application 402, etc.). Accordingly, a one-time token may be provided for decrypting a batch of data chunks or files.

As shown in FIG. 3C, at step 330, process 300 includes deriving a DEK(s) based on secret key(s). For example, data security system 102 (e.g., application 402, SDSS 404, etc.) may derive, based on the secret key ($SK_i$) received from the HSM 104 and the key encapsulation data, the DEK used to generate the encrypted data chunk ($C_{Mi}$). As an example, data security system 102 (e.g., application 402, SDSS 404, etc.) may derive, based on the further secret key ($SK_j$) received from the HSM 104 and the further key encapsulation data, the further DEK (e.g., DEK') used to generate the further encrypted data chunk ($C_{Mj}$). In such an example, and as shown at reference number 490 of FIG. 4C, application 402 and/or SDSS 404 may parse the header (Hdr) and derive, based on the secret key ($SK_i$) received from the HSM 104 and the key encapsulation data, the DEK used to generate the encrypted data chunk ($C_{Mi}$), and parse the further header (Hdr') and derive, based on the further secret key ($SK_j$) received from the HSM 104 and the further key encapsulation data, the further DEK (e.g., DEK') used to generate the further encrypted data chunk ($C_{Mj}$). For example, a DEK may be derived according to the following Equation (4):

$$DEK = H(g^{R \cdot SKi}) \quad (4)$$

where H is the hash function, g is the generator function, R is the random number, and $SK_i$ is the secret key.

In some non-limiting embodiments or aspects, as shown at reference number 492 in FIG. 4C, application 402 and/or SDSS 404 may verify the derived DEK (and/or the further derived DEK'). For example, application 402 and/or SDSS 404 may verify the derived DEK according to the following Equation (5):

$$H(PK_i) == (H(PK_i)^{H(DEK)})^{1/H(DEK)} \quad (5)$$

where H is the hash function and $PK_i$ is the public key.

As shown in FIG. 3C, at step 332, process 300 includes providing a derived DEK(s) for decrypting an encrypted data chunk(s), as shown at reference number 494 in FIG. 4C, to obtain a data chunk(s). For example, data security system 102 (e.g., application 402, SDSS 404, etc.) may provide the derived DEK for decrypting the encrypted data chunk ($C_{Mi}$) to obtain the data chunk ($M_i$). In such an example, data security system 102 (e.g., application 402, SDSS 404, etc.) may decrypt the encrypted data chunk ($C_{Mi}$) with the derived DEK to obtain the data chunk ($M_i$). As an example, data security system 102 (e.g., application 402, SDSS 404, etc.) may provide the further encrypted data chunk ($C_{Mj}$) with the derived further DEK (e.g., DEK') to obtain the further data chunk ($M_j$). In such an example, data security system 102 (e.g., application 402, SDSS 404, etc.) may decrypt the further encrypted data chunk ($C_{Mj}$) with the derived further DEK to obtain the further data chunk ($M_j$). In some non-limiting embodiments or aspects, application 402 may decrypt a data chunk ($M_i$) using Advanced Standard Encryption with Galois/Counter Mode (AES-GCM) encryption techniques.

In some non-limiting embodiments or aspects, as shown at reference number 496 in FIG. 4C, application 402 may iteratively decrypt the batch or set of data chunks by decrypting a chunk $C_{Mi}$, updating a header to a next header (e.g., from the header (Hdr) to the further header (Hdr')), and moving a key used for generating a DEK to a next key in the token (e.g., from $SK_i$ to $SK_j$, etc.). Accordingly, as previously noted, even if a DEK is compromised, an entire file or each data chunk encrypted by an application is still not recoverable by a malicious party because each data chunk is encrypted by a different DEK.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
   receiving, with at least one processor, from a hardware security module (HSM), a plurality of random keys ($r_1$, $r_2$, ... $r_n$);
   generating, with at least one processor, based on a generator function (g) and the plurality of random keys ($r_1$, $r_2$, ... $r_n$), a plurality of public keys ($PK_1$, $PK_2$, ... $PK_n$);

generating, with at least one processor, based on a hash function (H) and the plurality of public keys ($PK_1$, $PK_2$, ... $PK_n$), a plurality of secret keys ($SK_1$, $SK_2$, ... $SK_n$) that correspond to the plurality of public keys ($PK_1$, $PK_2$, ... $PK_n$);

providing, with at least one processor, to the HSM, the plurality of secret keys ($SK_1$, $SK_2$, ... $SK_n$);

receiving, with at least one processor, from the HSM, the plurality of secret keys ($SK_1$, $SK_2$, ... $SK_n$) encrypted with a key encryption key (KEK) as a plurality of ciphers ($C_1$, $C_2$, ... $C_n$);

storing, with at least one processor, in memory, the plurality of ciphers ($C_1$, $C_2$, ... $C_n$) in association with the plurality of public keys ($PK_1$, $PK_2$, ... $PK_n$), wherein the plurality of ciphers ($C_1$, $C_2$, ... $C_n$) includes the plurality of secret keys ($SK_1$, $SK_2$, ... $SK_n$) encrypted with the KEK, and wherein the plurality of secret keys ($SK_1$, $SK_2$, ... $SK_n$) correspond to the plurality of public keys ($PK_1$, $PK_2$, ... $PK_n$); and after storing, in the memory, the plurality of ciphers ($C_1$, $C_2$, ... $C_n$) in association with the plurality of public keys ($PK_1$, $PK_2$, ... $PK_n$), deleting, with at least one processor, the plurality of secret keys ($SK_1$, $SK_2$, ... $SK_n$) and the plurality of random keys ($r_1$, $r_2$, ... $r_n$).

2. The computer-implemented method of claim 1, further comprising:
receiving, with at least one processor, a data chunk ($M_i$) for encryption;
generating, with at least one processor, a data encryption key (DEK) based on the hash function (H), a public key ($PK_i$) of the plurality of public keys ($PK_1$, $PK_2$, ... $PK_n$), and a random number (R);
encrypting, with at least one processor, the data chunk ($M_i$) with the DEK to generate an encrypted data chunk ($C_{Mi}$);
generating, with at least one processor, a header (Hdr) including a cipher ($C_i$) of the plurality of ciphers ($C_1$, $C_2$, ... $C_n$) corresponding to the public key ($PK_i$) of the plurality of public keys ($PK_1$, $PK_2$, ... $PK_n$) and key encapsulation data;
storing, with at least one processor, in a database, a cipher text (CT) including the header (Hdr) and the encrypted data chunk ($C_{Mi}$);
receiving, with at least one processor, a request to decrypt the cipher text (CT);
in response to receiving a request to decrypt the cipher text (CT), providing, with at least one processor, to the HSM, the cipher ($C_i$);
receiving, with at least one processor, from the HSM, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$);
deriving, with at least one processor, based on the secret key ($SK_i$) received from the HSM and the key encapsulation data, the DEK used to generate the encrypted data chunk ($C_{Mi}$); and
providing, with at least one processor, the derived DEK for decrypting the encrypted data chunk ($C_{Mi}$) to obtain the data chunk ($M_i$).

3. The computer-implemented method of claim 2, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

4. The computer-implemented method of claim 2, further comprising:
receiving, with at least one processor, a further data chunk ($M_1$) for encryption;
generating, with at least one processor, a further data encryption key (DEK') based on the hash function (H), a further public key ($PK_j$) of the plurality of public keys ($PK_1$, $PK_2$, ... $PK_n$), and a further random number (R);
encrypting, with at least one processor, the further data chunk ($M_1$) with the further DEK' to generate a further encrypted data chunk ($C_{Mj}$);
generating, with at least one processor, a further header (Hdr') including a further cipher ($C_i$) of the plurality of ciphers ($C_1$, $C_2$, ... $C_n$) corresponding to the further public key ($PK_j$) of the plurality of public keys ($PK_1$, $PK_2$, ... $PK_n$) and further key encapsulation data;
storing, with at least one processor, in the database, a further cipher text (CT') including the further header (Hdr') and the further encrypted data chunk ($C_{Mj}$);
receiving, with at least one processor, a request to decrypt the further cipher text (CT');
in response to receiving a request to decrypt the further cipher text (CT'), providing, with at least one processor, to the HSM, the further cipher ($C_i$);
receiving, with at least one processor, from the HSM, a further secret key ($SK_1$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK' used to generate the further encrypted data chunk ($C_{Mj}$);
deriving, with at least one processor, based on the further secret key ($SK_j$) received from the HSM and the further key encapsulation data, the further DEK' used to generate the further encrypted data chunk ($C_{Mj}$); and
providing, with at least one processor, the further derived DEK for decrypting the further encrypted data chunk ($C_{Mj}$) to obtain the further data chunk ($M_1$).

5. The computer-implemented method of claim 4, further comprising:
generating, with at least one processor, a token based on the secret key ($SK_i$) and the further secret key ($SK_1$);
deriving, with at least one processor, based on the token and the key encapsulation data, the DEK; and
deriving, with at least one processor, based on the token and the further key encapsulation data, the further DEK'.

6. A system, comprising:
a memory;
one or more processors coupled to the memory and programmed and/or configured to:
receive, from a hardware security module (HSM), a plurality of random keys ($r_1$, $r_2$, ... $r_n$);
generate, based on a generator function (g) and the plurality of random keys ($r_1$, $r_2$, ... $r_n$), a plurality of public keys ($PK_1$, $PK_2$, ... $PK_n$);
generating, with at least one processor, based on a hash function (H) and the plurality of public keys ($PK_1$, $PK_2$, ... $PK_n$), a plurality of secret keys ($SK_1$, $SK_2$, ... $SK_n$) that correspond to the plurality of public keys ($PK_1$, $PK_2$, ... $PK_n$);
provide, to the HSM, the plurality of secret keys ($SK_1$, $SK_2$, ... $SK_n$);
receive, from the HSM, the plurality of secret keys ($SK_1$, $SK_2$, ... $SK_n$) encrypted with a key encryption key (KEK) as a plurality of ciphers ($C_1$, $C_2$, ... $C_n$);
store, in the memory, the plurality of ciphers ($C_1$, $C_2$, ... $C_n$) in association with the plurality of public keys ($PK_1$, $PK_2$, ... $PK_n$), wherein the plurality of ciphers ($C_1$, $C_2$, ... $C_n$) includes the plurality of secret keys ($SK_1$, $SK_2$, ... $SK_n$) encrypted with the KEK, and wherein the plurality of secret keys ($SK_1$, $SK_2$, ... $SK_n$) correspond to the plurality of public keys ($PK_1$, $PK_2$, ... $PK_n$); and after storing, in the memory, the plurality of ciphers ($C_1$, $C_2$, ... $C_n$) in association with the plurality of public keys ($PK_1$, $PK_2$, ... $PK_n$), delete, the plurality of secret keys ($SK_1$, $SK_2$, ... $SK_n$) and the plurality of random keys ($r_1$, $r_2$, ... $r_n$).

7. The system of claim 6, wherein the one or more processors are further programmed and/or configured to:

receive a data chunk ($M_i$) for encryption;

generate a data encryption key (DEK) based on the hash function (H), a public key ($PK_i$) of the plurality of public keys ($PK_1$, $PK_2$, ... $PK_n$), and a random number (R);

encrypt the data chunk ($M_i$) with the DEK to generate an encrypted data chunk ($C_{Mi}$);

generate a header (Hdr) including a cipher ($C_i$) of the plurality of ciphers ($C_1$, $C_2$, ... $C_n$) corresponding to the public key ($PK_i$) of the plurality of public keys ($PK_1$, $PK_2$, ... $PK_n$) and key encapsulation data;

store, in a database, a cipher text (CT) including the header (Hdr) and the encrypted data chunk ($C_{Mi}$);

receive a request to decrypt the cipher text (CT);

in response to receiving a request to decrypt the cipher text (CT), provide, to the HSM, the cipher ($C_i$);

receive, from the HSM, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$);

derive, based on the secret key ($SK_i$) received from the HSM and the key encapsulation data, the DEK used to generate the encrypted data chunk ($C_{Mi}$); and provide the derived DEK for decrypting the encrypted data chunk ($C_{Mi}$) to obtain the data chunk ($M_i$).

8. The system of claim 7, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

9. The system of claim 7, wherein the one or more processors are further programmed and/or configured to:

receive a further data chunk ($M_1$) for encryption;

generate a further data encryption key (DEK') based on the hash function (H), a further public key ($PK_j$) of the plurality of public keys ($PK_1$, $PK_2$, ... $PK_n$), and a further random number (R);

encrypt the further data chunk ($M_j$) with the further DEK' to generate a further encrypted data chunk ($C_{Mj}$);

generate a further header (Hdr') including a further cipher ($C_i$) of the plurality of ciphers ($C_1$, $C_2$, ... $C_n$) corresponding to the further public key ($PK_j$) of the plurality of public keys ($PK_1$, $PK_2$, ... $PK_n$) and further key encapsulation data;

store, in the database, a further cipher text (CT') including the further header (Hdr') and the further encrypted data chunk ($C_{Mj}$);

receive, a request to decrypt the further cipher text (CT');

in response to receiving a request to decrypt the further cipher text (CT'), provide, to the HSM, the further cipher ($C_i$);

receive, from the HSM, a further secret key ($SK_1$) of the plurality of secret keys ($SK_i$, $SK_2$, ... $SK_n$) that corresponds to the further public key ($PK_j$) of the plurality of public keys ($PK_1$, $PK_2$, ... $PK_n$) used to generate the further DEK' used to generate the further encrypted data chunk ($C_{Mj}$);

derive, based on the further secret key ($SK_j$) received from the HSM and the further key encapsulation data, the further DEK' used to generate the further encrypted data chunk ($C_{Mj}$); and provide the further derived DEK for decrypting the further encrypted data chunk ($C_{Mj}$) to obtain the further data chunk ($M_1$).

10. The system of claim 9, wherein the one or more processors are further programmed and/or configured to:

generate a token based on the secret key ($SK_i$) and the further secret key ($SK_j$);

derive, based on the token and the key encapsulation data, the DEK; and derive, based on the token and the further key encapsulation data, the further DEK'.

11. A computer program product comprising at least one non-transitory computer-readable medium including program instructions that, when executed by at least one processor, cause the at least one processor to:

receive, from a hardware security module (HSM), a plurality of random keys ($r_1$, $r_2$, ... $r_n$);

generate, based on a generator function (g) and the plurality of random keys ($r_1$, $r_2$, ... $r_n$), a plurality of public keys ($PK_1$, $PK_2$, ... $PK_n$);

generating, with at least one processor, based on a hash function (H) and the plurality of public keys ($PK_1$, $PK_2$, ... $PK_n$), a plurality of secret keys ($SK_1$, $SK_2$, ... $SK_n$) that correspond to the plurality of public keys ($PK_1$, $PK_2$, ... $PK_n$);

provide, to the HSM, the plurality of secret keys ($SK_1$, $SK_2$, ... $SK_n$);

receive, from the HSM, the plurality of secret keys ($SK_1$, $SK_2$, ... $SK_n$) encrypted with a key encryption key (KEK) as a plurality of ciphers ($C_1$, $C_2$, ... $C_n$);

store, in memory, the plurality of ciphers ($C_1$, $C_2$, ... $C_n$) in association with the plurality of public keys ($PK_1$, $PK_2$, ... $PK_n$), wherein the plurality of ciphers ($C_1$, $C_2$, ... $C_n$) includes the plurality of secret keys ($SK_1$, $SK_2$, ... $SK_n$) encrypted with the KEK, and wherein the plurality of secret keys ($SK_1$, $SK_2$, ... $SK_n$) correspond to the plurality of public keys ($PK_1$, $PK_2$, ... $PK_n$); and after storing, in the memory, the plurality of ciphers ($C_1$, $C_2$, ... $C_n$) in association with the plurality of public keys ($PK_1$, $PK_2$, ... $PK_n$), delete, the plurality of secret keys ($SK_1$, $SK_2$, ... $SK_n$) and the plurality of random keys ($r_1$, $r_2$, ... $r_n$).

12. The computer program product of claim 11, wherein the instructions further cause the at least one processor to:

receive a data chunk ($M_i$) for encryption;

generate a data encryption key (DEK) based on the hash function (H), a public key ($PK_i$) of the plurality of public keys ($PK_1$, $PK_2$, ... $PK_n$), and a random number (R);

encrypt the data chunk ($M_i$) with the DEK to generate an encrypted data chunk ($C_{Mi}$);

generate a header (Hdr) including a cipher ($C_i$) of the plurality of ciphers ($C_1$, $C_2$, ... $C_n$) corresponding to the public key ($PK_i$) of the plurality of public keys ($PK_1$, $PK_2$, ... $PK_n$) and key encapsulation data;

store, in a database, a cipher text (CT) including the header (Hdr) and the encrypted data chunk ($C_{Mi}$);

receive a request to decrypt the cipher text (CT);

in response to receiving a request to decrypt the cipher text (CT), provide, to the HSM, the cipher ($C_i$);

receive, from the HSM, a secret key ($SK_i$) of the plurality of secret keys ($SK_1$, $SK_2$, ... $SK_n$) that corresponds to the public key ($PK_i$) of the plurality of public keys ($PK_1$, $PK_2$, ... $PK_n$) used to generate the DEK used to generate the encrypted data chunk ($C_{Mi}$);

derive, based on the secret key ($SK_i$) received from the HSM and the key encapsulation data, the DEK used to generate the encrypted data chunk ($C_{Mi}$); and provide the derived DEK for decrypting the encrypted data chunk ($C_{Mi}$) to obtain the data chunk ($M_i$).

13. The computer program product of claim 12, wherein the key encapsulation data includes the hash of the public key $H(PK_i)$, the cipher ($C_i$), a generator function of the random number $g^R$, and the hash of the corresponding public key raised to a power of the hash of the DEK $H(PK_i)^{H(DEK)}$.

14. The computer program product of claim 12, wherein the instructions further cause the at least one processor to:

receive a further data chunk ($M_1$) for encryption;

generate a further data encryption key (DEK') based on the hash function (H), a further public key ($PK_j$) of the plurality of public keys ($PK_1$, $PK_2$, ... $PK_n$), and a further random number (R);

encrypt the further data chunk ($M_j$) with the further DEK' to generate a further encrypted data chunk ($C_{Mj}$);

generate a further header (Hdr') including a further cipher ($C_i$) of the plurality of ciphers ($C_1$, $C_2$, ... $C_n$) corresponding to the further public key ($PK_j$) of the plurality of public keys ($PK_1$, $PK_2$, ... $PK_n$) and further key encapsulation data;

store, in the database, a further cipher text (CT') including the further header (Hdr') and the further encrypted data chunk ($C_{Mj}$);

receive, a request to decrypt the further cipher text (CT');

in response to receiving a request to decrypt the further cipher text (CT'), provide, to the HSM, the further cipher ($C_1$);

receive, from the HSM, a further secret key ($SK_1$) of the plurality of secret keys ($SK_1$, $SK_2$, ... $SK_n$) that corresponds to the further public key ($PK_j$) of the plurality of public keys ($PK_1$, $PK_2$, ... $PK_n$) used to generate the further DEK' used to generate the further encrypted data chunk ($C_{Mj}$);

derive, based on the further secret key ($SK_1$) received from the HSM and the further key encapsulation data, the further DEK' used to generate the further encrypted data chunk ($C_{Mj}$); and provide the further derived DEK for decrypting the further encrypted data chunk ($C_{Mj}$) to obtain the further data chunk ($M_1$).

15. The computer program product of claim 12, wherein the instructions further cause the at least one processor to:

generate a token based on the secret key ($SK_i$) and the further secret key ($SK_1$);

derive, based on the token and the key encapsulation data, the DEK; and derive, based on the token and the further key encapsulation data, the further DEK'.

* * * * *

UNITED STATES PATENT AND TRADEMARK OFFICE
CERTIFICATE OF CORRECTION

PATENT NO. : 12,348,612 B2  
APPLICATION NO. : 18/241491  
DATED : July 1, 2025  
INVENTOR(S) : Sivanarayana Gaddam et al.

Page 1 of 2

It is certified that error appears in the above-identified patent and that said Letters Patent is hereby corrected as shown below:

In the Claims

Column 20, Line 4, Claim 4, delete "$(M_1)$" and insert -- $(M_j)$ --

Column 20, Line 8, Claim 4, delete "$(PK_i,$" and insert -- $(PK_1,$ --

Column 20, Line 10, Claim 4, delete "$(M_1)$" and insert -- $(M_j)$ --

Column 20, Line 13, Claim 4, delete "$(C_i)$" and insert -- $(C_j)$ --

Column 20, Line 24, Claim 4, delete "$(C_i);$" and insert -- $(C_j);$ --

Column 20, Line 26, Claim 4, delete "$(SK_1)$" and insert -- $(SK_j)$ --

Column 20, Line 37, Claim 4, delete "$(M_1).$" and insert -- $(M_j).$ --

Column 20, Line 41, Claim 5, delete "$(SK_1);$" and insert -- $(SK_j);$ --

Column 21, Line 47, Claim 9, delete "$(M_1)$" and insert -- $(M_j)$ --

Column 21, Line 55, Claim 9, delete "$(C_i)$" and insert -- $(C_j)$ --

Column 21, Line 65, Claim 9, delete "$(C_i);$" and insert -- $(C_j);$ --

Column 21, Line 66, Claim 9, delete "$(SK_1)$" and insert -- $(SK_j)$ --

Column 21, Line 67, Claim 9, delete "$(SK_i,$" and insert -- $(SK_1,$ --

Column 22, Line 12, Claim 9, delete "$(M_1).$" and insert -- $(M_j).$ --

Signed and Sealed this  
Twenty-sixth Day of August, 2025

Coke Morgan Stewart  
*Acting Director of the United States Patent and Trademark Office*

Column 23, Line 19, Claim 14, delete "($M_1$)" and insert -- ($M_j$) --

Column 23, Line 27, Claim 14, delete "($C_i$)" and insert -- ($C_j$) --

Column 24, Line 7, Claim 14, delete "($C_1$);" and insert -- ($C_j$); --

Column 24, Line 8, Claim 14, delete "($SK_1$)" and insert -- ($SK_j$) --

Column 24, Line 15, Claim 14, delete "($SK_1$)" and insert -- ($SK_j$) --

Column 24, Line 21, Claim 14, delete "($M_1$)." and insert -- ($M_j$). --

Column 24, Line 25, Claim 15, delete "($SK_1$);" and insert -- ($SK_j$); --